US009908800B2

(12) United States Patent
Weiss

(10) Patent No.: US 9,908,800 B2
(45) Date of Patent: Mar. 6, 2018

(54) SYSTEM AND METHOD FOR WASTEWATER TREATMENT

(75) Inventor: Alan M. Weiss, Dallas, TX (US)

(73) Assignee: Global Water Group, Incorporated, Dallas, TX (US)

(*) Notice: Subject to any disclaimer, the term of this patent is extended or adjusted under 35 U.S.C. 154(b) by 364 days.

(21) Appl. No.: 13/087,086

(22) Filed: Apr. 14, 2011

(65) Prior Publication Data
US 2012/0261337 A1   Oct. 18, 2012

(51) Int. Cl.
C02F 9/00 (2006.01)
C02F 3/00 (2006.01)
(Continued)

(52) U.S. Cl.
CPC ............... C02F 9/00 (2013.01); C02F 1/001 (2013.01); C02F 1/28 (2013.01); C02F 3/00 (2013.01);
(Continued)

(58) Field of Classification Search
CPC .... C02F 9/00; C02F 1/32; C02F 3/286; C02F 1/001; C02F 1/28; C02F 2303/04; C02F 11/06; C02F 2301/046; C02F 2303/16; C02F 3/02; C02F 3/00; C02F 3/12; C02F 3/121; C02F 1/442; C02F 1/76; C02F 1/00; C02F 3/342; C02F 2303/24; C02F 3/006; C02F 2103/001; C02F 2103/002; C02F 2103/005; C02F 2203/006; C02F 2209/005; C02F 2209/03; C02F 2209/40; C02F 2209/42; Y02W 10/15
(Continued)

(56) References Cited

U.S. PATENT DOCUMENTS 3,713,543 A * 1/1973 Heaney .................. 210/196
4,271,026 A * 6/1981 Chen et al. ............. 210/605
(Continued)

FOREIGN PATENT DOCUMENTS

CN   1524810 A   9/2004
CN   1769218 A   5/2006
(Continued)

OTHER PUBLICATIONS

International Search Report and Written Opinion issued for PCT Application No. PCT/US2012/032414, dated Jul. 12, 2012, 12 pages.
(Continued)

Primary Examiner — John Kim
(74) Attorney, Agent, or Firm — Norton Rose Fulbright US LLP

(57) ABSTRACT

A system that recycles waste so that the effluent coming out of the system actually equals a potable water standard with essentially no contaminated sludge. The solids in wastewater are subjected to aeration and enzymes in a digester for a period of time. The cleanest portion of the water from the digester is then clarified. Sludge, as well as scum, from the clarifier is vacuumed back to the digester. Clear water from the clarifier is delivered to a Recycling stage for filtering to remove suspended solids. When the recycling process housing reaches saturation, a back-flushing process with clean water sends all of the captured suspended solids back into the Digester.

47 Claims, 6 Drawing Sheets

(51) Int. Cl.

| | | |
|---|---|---|
| *C02F 1/00* | (2006.01) | |
| *C02F 1/28* | (2006.01) | |
| *C02F 11/06* | (2006.01) | |
| *C02F 1/44* | (2006.01) | |
| *C02F 3/02* | (2006.01) | |
| *C02F 3/12* | (2006.01) | |
| *C02F 3/28* | (2006.01) | |
| *C02F 3/34* | (2006.01) | |
| *C02F 1/32* | (2006.01) | |
| *C02F 1/76* | (2006.01) | |
| *C02F 103/00* | (2006.01) | |

(52) U.S. Cl.
CPC .............. *C02F 3/02* (2013.01); *C02F 3/121* (2013.01); *C02F 3/286* (2013.01); *C02F 3/342* (2013.01); *C02F 11/06* (2013.01); *C02F 1/32* (2013.01); *C02F 1/442* (2013.01); *C02F 1/76* (2013.01); *C02F 3/006* (2013.01); *C02F 3/12* (2013.01); *C02F 2103/001* (2013.01); *C02F 2103/002* (2013.01); *C02F 2103/005* (2013.01); *C02F 2203/006* (2013.01); *C02F 2209/005* (2013.01); *C02F 2209/03* (2013.01); *C02F 2209/40* (2013.01); *C02F 2209/42* (2013.01); *C02F 2301/046* (2013.01); *C02F 2303/04* (2013.01); *C02F 2303/16* (2013.01); *C02F 2303/24* (2013.01); *Y02W 10/15* (2015.05)

(58) Field of Classification Search
USPC ....... 210/620, 621, 523, 624, 631, 609, 629, 210/257.1, 259, 260, 295, 532.1, 748.1, 210/748.11
See application file for complete search history.

(56) References Cited

U.S. PATENT DOCUMENTS

| | | | | |
|---|---|---|---|---|
| 4,915,840 A | * | 4/1990 | Rozich | C02F 1/025 210/605 |
| 5,254,246 A | | 10/1993 | Rivelli et al. | |
| 5,468,375 A | | 11/1995 | Lira | |
| 6,110,374 A | * | 8/2000 | Hughes | 210/638 |
| 6,132,614 A | | 10/2000 | Perslow et al. | |
| 2002/0005385 A1 | * | 1/2002 | Stevens et al. | 210/748 |
| 2004/0007523 A1 | * | 1/2004 | Gabon et al. | 210/605 |
| 2005/0131084 A1 | | 6/2005 | Kohler et al. | |
| 2005/0131085 A1 | | 6/2005 | Kohler et al. | |
| 2006/0108284 A1 | | 5/2006 | Christeson | |
| 2007/0056902 A1 | * | 3/2007 | Kelly | 210/609 |
| 2007/0114182 A1 | * | 5/2007 | DePoli et al. | 210/703 |
| 2010/0038310 A1 | | 2/2010 | Shafer et al. | |
| 2010/0155328 A1 | | 6/2010 | O'Regan, Jr. | |
| 2010/0200484 A1 | | 8/2010 | Premathilake et al. | |
| 2010/0224558 A1 | * | 9/2010 | Barker | 210/636 |
| 2011/0005284 A1 | | 1/2011 | Conner et al. | |

FOREIGN PATENT DOCUMENTS

| | | |
|---|---|---|
| CN | 101767908 A | 7/2010 |
| CN | 101891337 A | 11/2010 |
| WO | WO/2009/120384 | 10/2009 |
| WO | WO/2010/059165 | 5/2010 |
| WO | WO-2011 005928 A1 | 1/2011 |

OTHER PUBLICATIONS

Isenburg T: "Aufbereitung von sanitarem Abwasser—geschlossenger kreislauf", Galvanotechnik, Eugen G. Leuze Verlag, Saulgau/Wurtt, DE; vol. 100, No. 4, Apr. 1, 2009; pp. 960-965.

Partial Search Report issued from the European Patent Office for EP 12771669.4, dated Dec. 3, 2014, 6 pages.

Office Action issued for Chinese Patent Application No. 201280029430.5 dated Dec. 17, 2014, 9 pages with English Language translation.

Extended Search Report issued for European Patent Application No. 12771669.4, dated May 25, 2015, 15 pages.

Jian Jing, "Design of Mechanical Appliance for Environmental Protection" Metallurgical Industry Press, Jun. 30, 2009, pp. 159-164.

Office Action issued for Chinese Patent Application No. 2012800294305, 29 pages with English language translation.

* cited by examiner

SYSTEM AND METHOD FOR WASTEWATER TREATMENT

TECHNICAL FIELD

This disclosure relates to water treatment and more particularly to systems and methods for rehabilitating wastewater and even more particularly to systems and methods for accepting wastewater and producing therefrom potable water with essentially no residual sludge.

BACKGROUND OF THE INVENTION

It is fundamental that water is essential for the survival of most plants and animals. Potable water is also a resource that is finite is quantity and quality. Because of its widespread use as a human consumable and for supporting food growth it is vital that a steady supply of potable water continue to be available. Potable in this context means water of sufficiently high quality that it can be consumed or used with low risk of immediate or long term harm. While there certainly can be a wide variance in tolerances in different geographical locations, the basic requirements are the same everywhere, only the tolerance levels may change.

To achieve potable water from water that is outside the potable limits (whatever they may be for a given region) there are three things that must be accomplished. These are: removal of parasites; removal of hazardous chemicals; and removal of bacteria and viruses. Collectively, parasites, hazardous chemicals, bacteria and viruses can be thought of as contaminants. If all these contaminates are removed then the resultant water is pure. However, since humans can tolerate some levels of contaminants (in fact some parasites, bacteria and viruses may actually be helpful) it is not necessary that the levels be reduced to zero to have potable water. But the harmful ones must be reduced below the tolerance level for a given region.

Parasites removal requires filtration of water born solid to a level in the one micron range. Since the human eye does not see solids smaller than approximately 25 microns, and since the filtration process slows down water movement, a typical municipal system would filter down to the sub-25 micron level but not below 3-microns. Thus, parasites, such as cryptosporidium and giardia, can be found in municipal water.

Many hazardous chemicals do not respond to filtration. They are instead removed by absorption and adsorption. Absorption is an inside process while adsorption occurs on the outside of the combination of media (minerals) being used. For example, carbon would operate to absorb and adsorb hazardous chemicals. At a certain point when the media (carbon or other material) tank is full, it is discarded and a fresh media tank installed. But it is not filtration. The hazardous chemicals are typically water soluble and need to be grabbed. There are two factors involved in achieving the "grabbing". One factor is to have a formula of various minerals, that in conjunction with each other work to absorb or adsorb the chemicals. The second factor is retention time, so that the chemicals in the water coming through have enough time to be "grabbed", instead of being channeled through. One system for "grabbing" chemicals from water is the Global-LS3-Multi-Media-Treatment Process available from Global Water Group located in Dallas, Tex.

Bacteria and viruses are typically reduced by chlorine. However, chlorine is a hazardous chemical. The World Health Organization has been trying to stop the use of chlorine as a water cleaning agent because chlorine in water that has not been cleaned—and as above-noted most water is not cleaned—creates carcinogens. Some people estimate that a high percentage of cancer deaths stem from chlorine treated water. An alternative for killing bacteria and viruses in water is to expose the water to ultra-violet light.

One major problem in the treatment of wastewater is the creation of a byproduct called sludge. The sludge, by definition, contains the contaminants removed from the water. Wastewater sludge carries all the contaminants, hazardous metals, chemicals, etc. and today this sludge is dumped in a landfill. The contaminants then leach into the earth and find their way to aquifers, rivers and streams all over the world. Not a good situation.

In the offshore oil and gas business since there are no fields in which to dump the sludge they have designed systems using the concept of aerobics. These systems use organisms to eat the organic sludge. The residual, while cleaned substantially, is not perfectly free of contaminants. This residual is then chlorinated and then dumped. Since the residual is not perfectly clean, carcinogens are formed which are then spread about.

An activated sludge system is known. In such a system the water would first be exposed to aeration where particles are broken up and biologically reduced. Then the partially cleaned water goes through a clarifier and the sludge would be pumped back until most of it is reduced. The remaining sludge is then dumped. The process takes about 24 hours but still results in suspended solids and viruses.

Thus, the existing extended aeration-activated sludge systems take too long to process and do not yield potable water.

BRIEF SUMMARY OF THE INVENTION

The present invention is directed to a system and method which recycles waste so that the effluent coming out of the system actually equals a potable water standard with essentially no contaminated sludge. In one embodiment, the solids in wastewater are subjected to aeration and enzymes in a digester for a period of time. The cleanest portion of the water from the digester is then clarified. Sludge, as well as scum, from the clarifier is vacuumed back to the digester. Clear water from the clarifier is delivered to a Recycling stage for filtering to remove suspended solids down to 5-microns. When the recycling process housing reaches saturation, a back-flushing process with clean water sends all of the captured suspended solids back into the Digester. The effluent, other than during back-flushing, from the Recycler is then passed through:
  1) a water purification process to remove parasites;
  2) a treatment to reduce hazardous chemicals; and
  3) a UV (or other non-hazardous process) to remove, kill or inactivate all bacteria and viruses, all without producing sludge.

The output from this final state is potable water. In one embodiment, a single final stage can serve multiple digester/clarifier stages.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
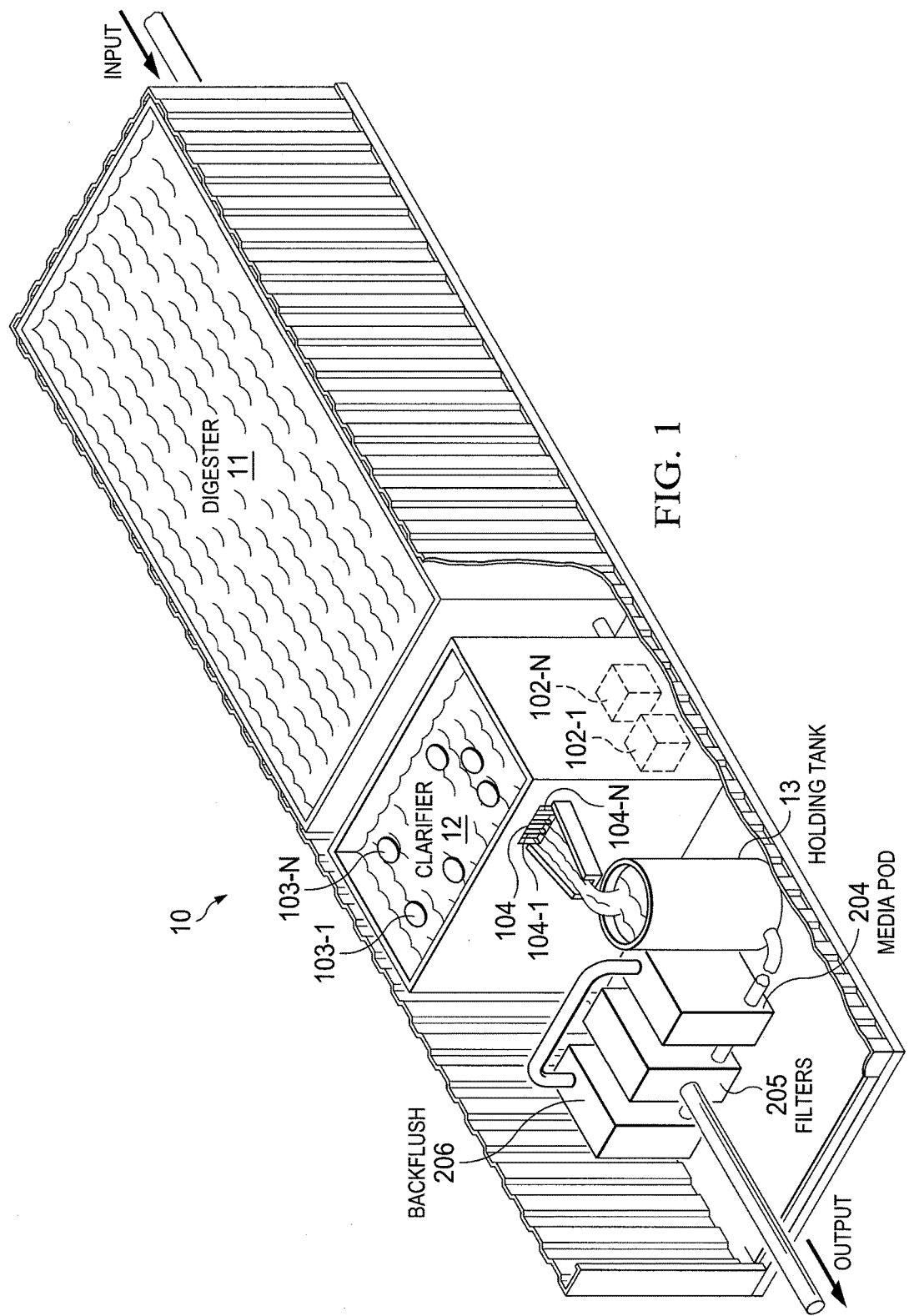
FIG. 1 shows one embodiment of a water treatment facility in accordance with the teachings of the invention.

FIG. 1 shows one embodiment 10 of a wastewater treatment facility in accordance with the teachings of the invention. While this embodiment shows a wastewater treatment facility constructed within a 40 foot container it should be understood that the concepts discussed herein can be used as well for permanent in-the-ground facilities, as would be customary with a municipal treatment center. Water, wastewater in our example, enters from the right and as will be seen, potable water exits from the left.

The wastewater enters digester 11 which in essence is a large tank containing aeration equipment (not shown) and bacteria that feeds on the waste products in the water. The feed water from a sewer line or from other sources of waste water pass into the digester. Usually a lift station would be positioned to enable water flow. The wastewater is typically from toilets, sinks, showers, etc. and if desired a screen can be positioned at the input to catch debris larger than a certain size, say larger than an inch. In the embodiment shown, air vents are positioned in the digester run by low pressure blower systems that generate substantial cubic feet per minute (cfm). These are regulated depending on the amount of water flow into the system so as to produce a constant churning of the water under air pressure. Air flows from the bottom to provide a rolling motion to the water serving to break up suspended solids. There are also air vents along the top.

If the embodiment shown in FIG. 1 were to be designed to handle 12,000 gallons a day then because this is a 12-hour system, the digester would be sized to hold approximately 6,000 gallons. As more water enters from the right, water empties from the left into the clarifier. This occurs because water spills through openings in the partition between digester portion 11 and clarifier portion 12. These openings (two in the example) are baffled so that the air-induced motion in the digester is not imparted to the clarifier.

If the input water slows down, less water goes through the clarifier because the water will just balance out between clarifier and digester. The openings between the digester and the clarifier are positioned so that the cleanest of the water, typically in the lateral and vertical middle of the digester tank near the clarifier wall finds its way into the clarifier. It is not critical where the water comes from that flows into the clarifier, but the cleaner it is the more efficient the operation will be. The openings are shielded so the water just doesn't flow quite out. The water meanders through the opening and this reduces the agitation.

In clarifier 12 there are baffles and other areas that make the water as still as possible. The baffles are cross-hatched and everything comes down in an angle to one, two or even more boxes 102-1 to 102-N each about a foot cubed. The idea of the clarifier is that suspended solids in the water from the digester drop into one of the boxes. A pipe (not shown) at the bottom vacuums the dropped solids and deposits them back into the digester. Any scum (such as 103-1 to 103-N) that comes to the surface of the clarifier is also skimmed off by skimmers (not shown) and returned to the digester. The vacuum and the skimmers are all part of the air flow of the system.

Water from just below the skimmers which is the cleanest water in the clarifier falls over weir 104, which is a tooth-looking bar 104-1 to 104-N that holds solids back as the water flows out of the clarifier. Again, as with the water coming into the clarifier, the system is open such that the levels remain even. Thus, the more water that enters the clarifier the more water that will fall over the weir and enter holding tank 13.

As will be discussed below, water from the holding tank is filtered by media pod 204 which acts, as will be discussed, as a recycler. In one embodiment, media pod is a tank containing filtering media, such as Micro-Z. The media captures suspended solids down to a level of approximately 5 microns. Note that the system will work well even at 10 microns. The output of media pod 204, devoid of suspended solids above the set level then flows to water purification process 205. When the recycler is full (it is full when the pressure builds to a certain level) it is back flushed with pure water saved earlier in the process. The back flush ends up in digester 11 where the bacteria in the digester tank will continue eating the suspended solids. This all works by a valve system under computer control.

The valves are all set in certain configuration to let flow come from one pipe to another. The water comes into the recycler and when it comes out of the recycler it goes into water purification system 205 which will be discussed below. The back-flush tank is the first thing that is filled before potable water is allowed to exit the system. When the back-flush tank is full the computer automatically stops filling and sets the values to expel the potable water directly from the clarifier.

Note that system 10 as illustrated in FIG. 1 is shown without all the piping, valves and control equipment that would be necessary for an operational system. One skilled in the art can easily run the pipes and the place the valves based upon the discussion herein, particularly the discussion below with respect to FIG. 2.

In one embodiment the system has seven valves as will be discussed with respect to FIG. 2.

The size of the clarifier should be adjusted based on the volume of the water coming into a particular digester. For example, if there is one container, then the clarifier must have enough total volume capacity to equal at least 14% of the flow capacity for 12 hours of operation. One way to do this is to design the digesters to be approximately the same volume as the 12 hour volume. So for a 12,000 gallon a day (24 hour) system, the digester will have 6,000 gallon capacity. The clarifier needs to be at least $\frac{1}{6}^{th}$ of the size of the digester. Allowing for surges, more capacity might be allocated to the digester and thus the clarifier might be closer to $\frac{1}{5}^{th}$ the size of the digester. Allocation for operations that require more surge control might have larger proportioned digesters or larger holding tanks prior to the digester or following the clarifier. Surges are also moderated by enlarging the recycling process and/or the water purification process. Excessive flow is protected by the capturing of the suspended solids and the purification of the throughput. Excesses of flow beyond the capacity of the recycler and the water purification process are automatically returned to the digester.

It is optional as to whether a system will have the recycler and water purification in the same container or not. A portable system, such as is used by the military, or in flooding or disaster situations, most likely would. On the other hand, a municipal system probably would have a container (or in-ground tank) that is digester/clarifier, and then another facility that would house a recycler/water purification system. Usually the blower systems that would be used for creating the air movement and the vacuum would be in the digester/clarifier container, but it might be in the recycler or as a stand-alone unit.

Without the recycling and purification process the output of the system would be similar to wastewater systems with suspended solids, high e-coli and sludge. Because of the recycling and water purification processes as discussed herein, the time element for the aeration process is basically cut in half, the sludge is virtually eliminated and the output effluent will be "green", environmentally correct and even potable.

Figure 2:
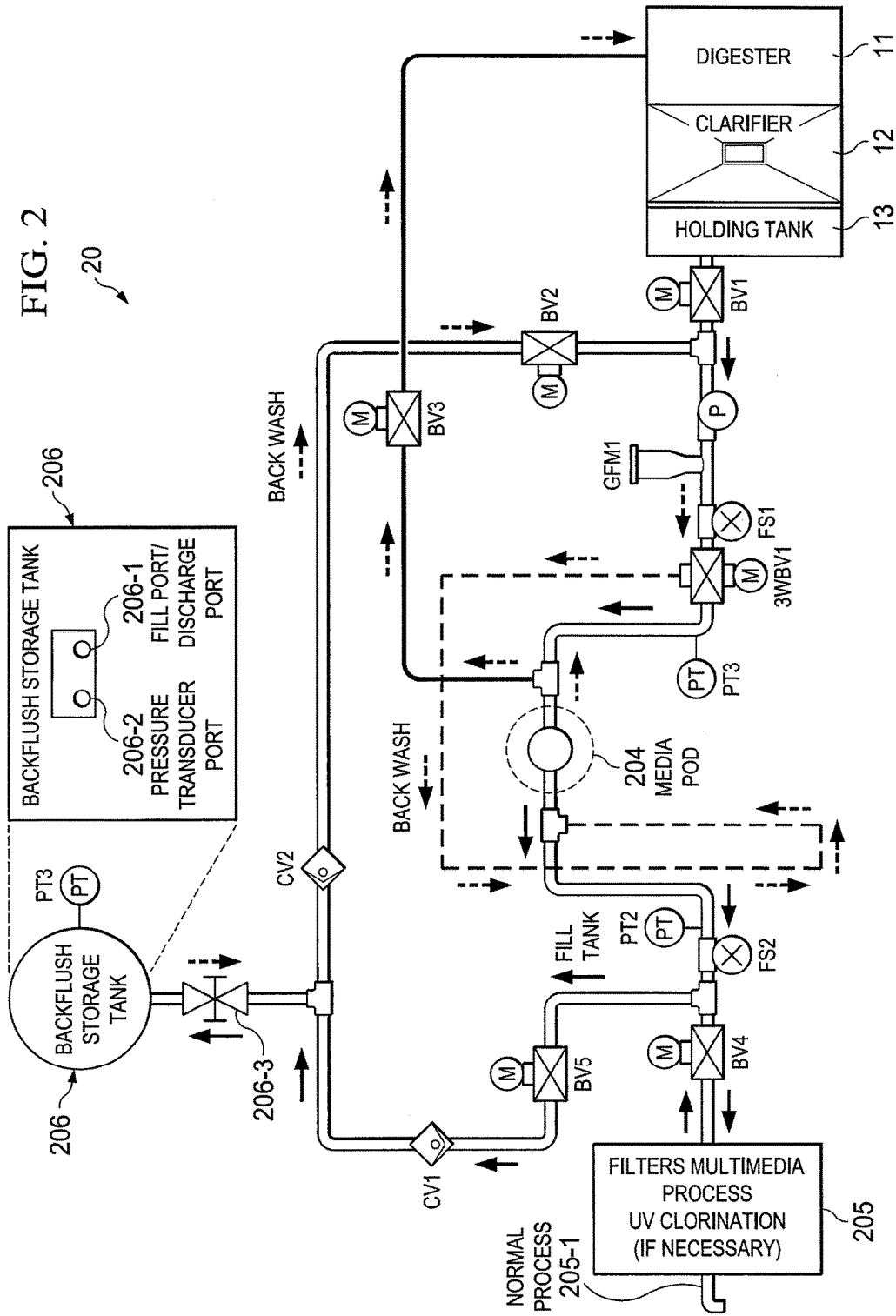
FIG. 2 shows one embodiment of a Recycler Flow Diagram used with the facility of FIG. 1.

FIG. 2 shows one embodiment 20 of a control system used for enabling the pump and valves of the facility of FIG. 1. First, the wastewater enters wastewater digester 11 for the aeration process. Clearer water is pushed into clarifier 12 to separate sludge from effluent and then the clearest water seeps over the weir into holding tank 13. The holding tank effluent flows into media pod 204. The media pod captures suspended solids. The water then flows through the media pod and enters final stage filtering, UV and/or chemical cleaning (chlorination) process 205. The filtering process is, for example, available from Global Water under the name LS3™. The water then emerges from process 205 via output 205-1 as purified water. Another example of a filter that can be used is shown in PCT application "Porous Block Nanofiber Composite Filters", filed on Nov. 21, 2008 under PCT Application Number: PCT/US2008/084434 (WO 2010/059165 A1) which application is hereby incorporated by reference herein.

If backflush tank 206 is empty, or low, pressure transducer 206-1 senses this condition and the purified water from process 205 is diverted to the backflush tank by reversing valve BV4 and opening valve BV5. Check valve FS2 prevents the clear water from tank 205 from flowing back to media pod 204. Note that in backflush tank 206, in this embodiment, pressure transducer 206-2 is located away from the water flow inlet/outlet port 206-1 to prevent false readings.

When the backflush tank is full, as detected by differential pressure transducer 206-3, the computer stops the system. The valves then change their flow direction status so that water flows from holding tank 203 through media pod 204 to final stage process 205. The system then restarts. The output of process 205 is available to flow out of system 20 via output 205-1 for any desired re-use (toilets, showers, maintenance, reservoir refilling, straight disposal or drinking.). This is an environmentally "green" output.

Pressure transducer PT3 signals the computer to stop the system when media pod (or pods if more than one are used) 204 fills with suspended solids. Valves BV2 and BV3 open, valve 3WBV1 changes direction and valve BV4 closes. The computer then restarts the system and this time the pumping process back washes media pod 204 until the backflush tank is emptied back into digester 11. This then delivers the suspended solids from pod 204 back to digester 11 and the back wash process is complete.

The computer again automatically stops the system. Again, the valves change their flow direction so that water flows from holding tank 13 through media pod 204 to process 205. The computer then again restarts the system now with valve BV5 open and valve BV4 reversed so as to re-fill backflush tank 206. When the backflush tank is full the valves revert to their normal position such that all the water that has been processed is now available at the output of process 205.

Note that not all the water from process 205 needs be diverted to backflush tank so that a continuous output supply could be made available if desired. Also note that a single backflush tank could server multiple media pods or multiple systems if desired.

FIGS. 3A through 3J show examples of display messages for various aspects of the system.

Figure 3A:
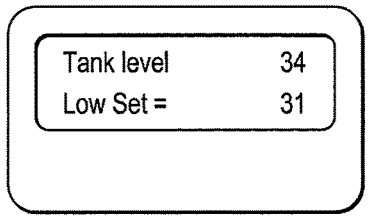
FIGS. 3A through 3J show examples of display messages for various aspects of the system shown in FIG. 1.

FIG. 3A shows "Tank level" for the back flush operation. The numbers indicate tank water level in inches. "Low Set" is the current shut off point used during a back wash run. It will normally be about 8 inches depending on the tank plumbing.

Figure 3B:
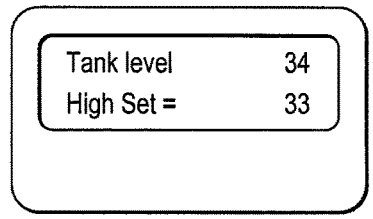

FIG. 3B shows "High Set" and is the shut off point when the tank is being filled. It will normally be set at about 30 inches. "Low Set" and "High Set" are system calibration variables and can change for different systems.

Figure 3C:
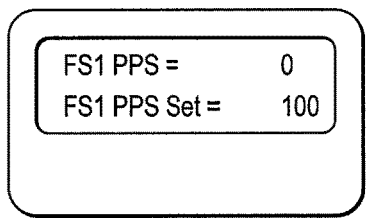

FIG. 3C shows "FS1 PPS" and is the pulses per second produced in flow sensor FS1 (Flow Sensor 1) during pumping to LS3™ (LS3 is a trademark of Global Water and the LS3 product is available from Global Water). "FS1 PPS Set" shows the pump speed. The system adjusts the VFD (Variable Frequency Drive) speed to match the FS1 PPS with the set point.

Figure 3D:
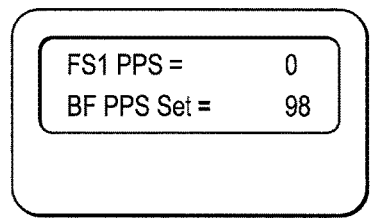

FIG. 3D shows the pump set point for back washing.

Figure 3E:
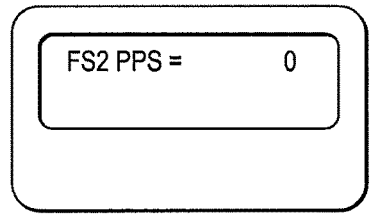

FIG. 3E shows the PPS from flow sensor FS2 during normal pumping to LS3™ and serves primarily as an indication that the system is working. During back wash, if the system detects pulses in the LS3™, it will sound an alarm and shut down. This usually only happens if a valve fails.

Figure 3F:
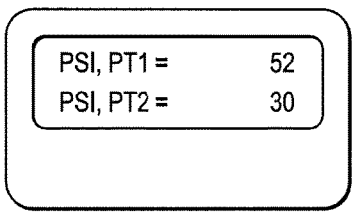

FIG. 3F shows pressure transducers PT1 and PT2. PT1 is before the recycler media and PT2 is after the media and before the LS3™ component. The system remembers the highest reading for each and saves it for display.

Figure 3G:
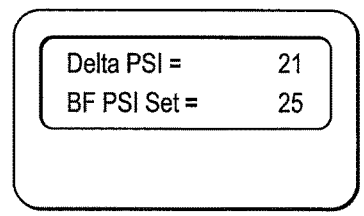

FIG. 3G shows the change (delta) between PT1 and PT2. Thus, PSI=PT1−PT2. If PSI is greater than the "BF PSI Set point" during a pumping operation, the system will automatically back wash as soon as the current pumping operation has completed.

Figure 3H:
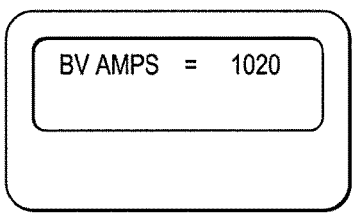

FIG. 3H shows an analog to digital conversion of the current (amperage) being consumed in moving the various ball valves. The ball valves are, in this embodiment, moved one at a time so that one signal conditioning circuit can test all. This display is for trouble shooting purposes.

Figure 3I:
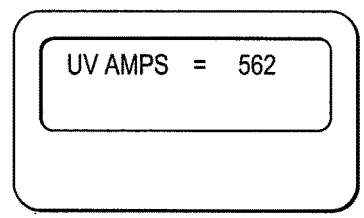

FIG. 3I shows an analog to digital conversion produced as a result of current (amperage) in the UV lamp(s). This display is for trouble shooting purposes.

Figure 3J:
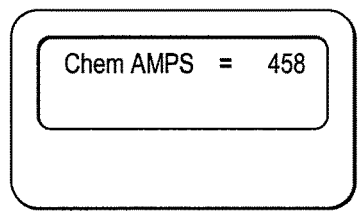

FIG. 3J shows an analog to digital conversion produced as a result of current (amperage) in the chlorine pump. This display is for trouble shooting purposes.

Figure 4:
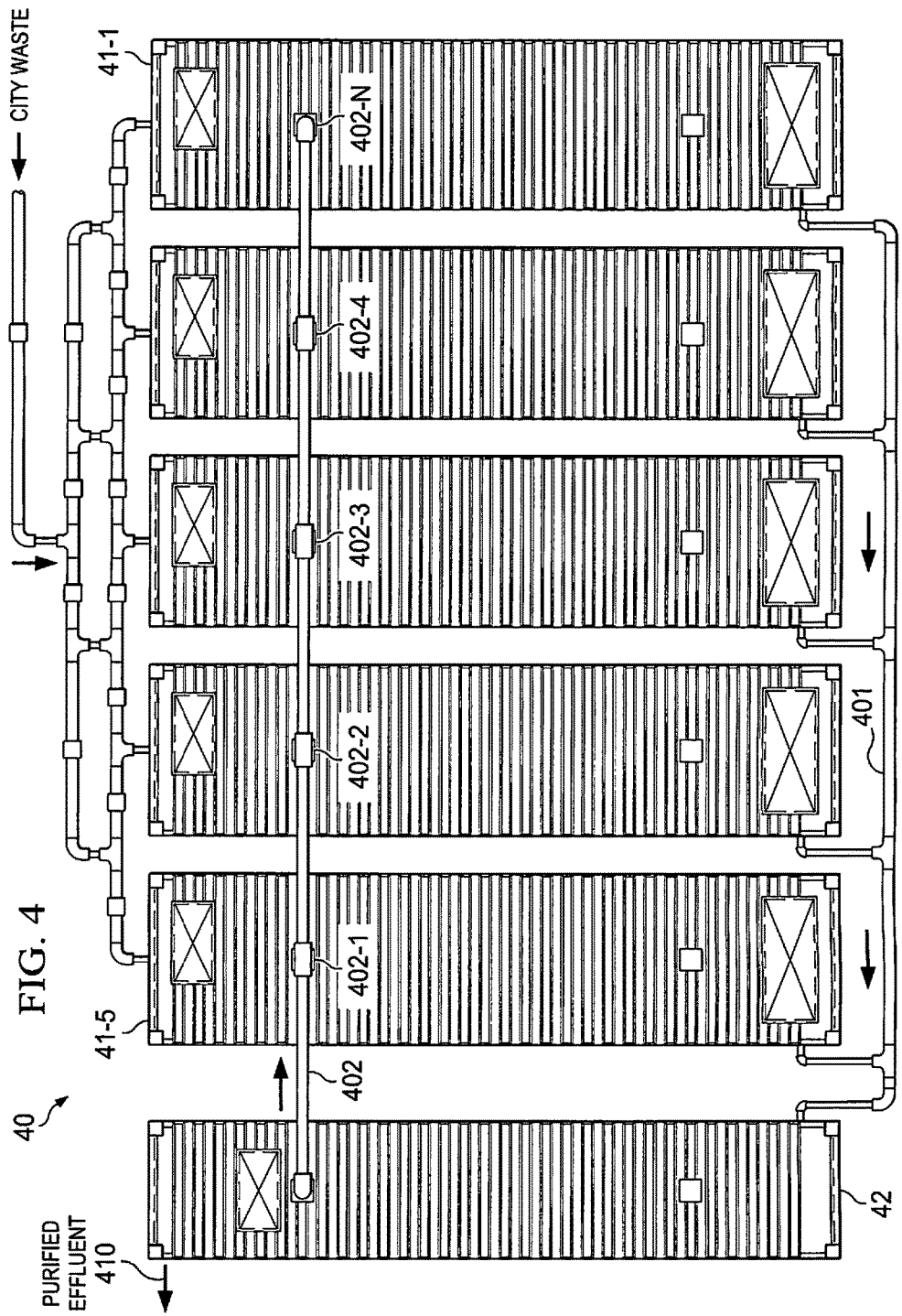
FIGS. 4 and 5 show the modular nature of a water treatment system where multiple digester/clarifiers can feed a single final stage recycling process.
Figure 5:
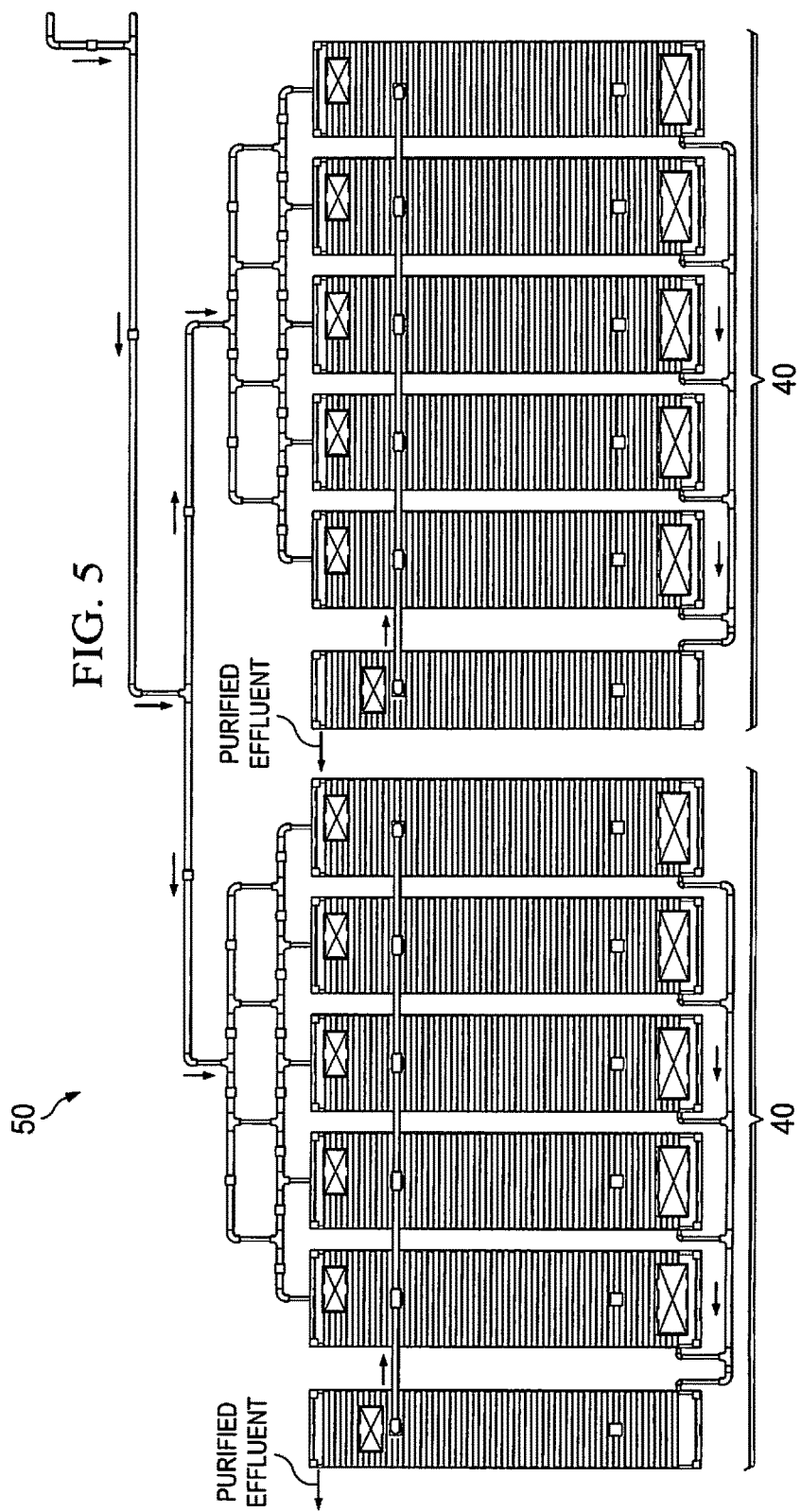

FIGS. 4 and 5 show the modular nature of a water treatment system where multiple digesters/clarifiers can feed a single final stage recycling process. FIG. 4 shows modular system 40 which is an example of a 250,000 gallon a day (or one thousand cubic meters, which is 264,500 GPD). In this example, each container 41-1 to 41-5 houses a digester (D) and a clarifier (C) with the clarifier sized as discussed above. Each digester would be sized to process approximately $\frac{1}{5}^{th}$ or 50,000 gallons in 24 hours and thus the digester portion would hold about 25,000 gallons of water.

Wastewater (or any water that needs to be rehabilitated) flows in via inlet 401 and is metered to the respective tanks by a system of valves. The inlet to each digester is via respective pipe 402-1 to 402-N. Note that while the piping and valves are shown interconnected this need not be the case and wastewater can flow into each of the digesters from an independent source of wastewater. Note that the water going to some of the digesters can be sewer type water and water going to other of the digester inlets can be storm drain type water. In fact, if desired, multiple types of wastewater can be input into the same digester if desired. Regardless of where the water at the input to the various digesters originates, the output from all of the digester/clarifiers in the cluster can be processed by a single recycler 42 sized to handle 250,000 gallons/day. Input to recycler 42 is via pipe 401 and the potable water output flows out of outlet 410. Because the digester/clarifiers are stand-alone units in this embodiment, they can be physically located anywhere desired and need not be in the same geographical location with each other or even with recycler 42. The only proviso being that there needs to be a feedback of water containing suspended solids over the filter limit (5 microns in this example) from the recycler to the digester. In FIG. 4 this is shown by arrow 402. Note, however, that the feedback need be to only one of the digesters even though the recycler is handling water from five different digester/clarifier pairs. Also note that the digester and clarifier need not be in the same housing and in fact several digesters can feed into a common clarifier if desired.

The cluster is set at 250,000 gallons or a thousand cubic meters because that is an optimum efficiency for water purification. The system must be sized to be able to handle flow rate and still be able to remove parasites, hazardous chemicals, and kill the bacteria and viruses. That is what this cluster is designed for. Thus, to process 2,000 cubic meters a day the system would require two clusters, etc. The system may be constructed modularly such that a plurality of digester portions and plurality of clarifier portions work together to feed a single purifier system.

FIG. 5 shows system 50 having two clusters 40. System 50 can process wastewater at the rate of two thousand cubic meters a day. Four thousand cubic meters of water processing will require, of course, four clusters. Thus, the concepts discussed herein can be scaled up to whatever size is necessary and this scaling can be done as the demand increases. Also, as discussed, it does not have to be all built in the same location. Since there is no sludge output the system is green even when scaled to a million gallons/day or to 25 million gallons/day (100 clusters). The clusters can be arranged with piping such that one can substitute for another for cleaning and maintenance purposes.

As discussed above, there are sensors to detect pressure, to detect power capacity, air flow, etc. which are all important components in making the system work properly. If desired, this can all be monitored from a common location, whether it is one container or a hundred containers.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A wastewater treatment facility comprising:
an aerobic digester for accepting wastewater to be treated;
a clarifier for accepting digester output water;
a recycler comprising a filtering component, said recycler configured for accepting clarifier output water and for separating solids above an established size;
means for reintroducing separated ones of said solids back into said digester, said means for reintroducing comprising apparatus configured to automatically back flush said filtering component, based on a predetermined difference in a pressure measurement before said filtering component and a pressure measurement after said filtering component, so that said separated ones of said solids are sent to said digester, said apparatus configured to back flush comprises a back flush tank for storing water to back flush said filtering component, wherein said aerobic digester is the only portion, of said wastewater treatment facility, adapted to reduce said separated ones of said solids;
a water purification component comprising:
means for reducing parasites, hazardous chemicals, bacteria and viruses from separated water containing solids below said established size from said recycler; wherein said parasites, said hazardous chemicals, said bacteria and said viruses being reduced to a point where said separated water containing solids below said established size is potable; and
an output for flowing said potable water from said wastewater treatment facility, wherein said output is the only output of said wastewater treatment facility.

2. The treatment facility of claim 1 wherein said established size is 5 microns.

3. The treatment facility of claim 1 wherein said means for reducing parasites comprise means for filtering suspended solids 1 micron or above.

4. The treatment facility of claim 1 wherein said means for reducing hazardous chemicals comprise means for adsorption and absorption of said chemicals resulting in byproducts that are non-toxic.

5. The treatment facility of claim 1 wherein said means for reducing bacteria and viruses comprise means for exposing said water containing solids below said established size to ultra-violet light.

6. The treatment facility of claim 1 wherein said water purification component comprises:
   means for filtering suspended solids above 1 micron to produce filtered first output water;
   means for adsorption and absorption of hazardous chemicals in said filtered first output water, said adsorption yielding second output water as well as non-toxic, non-sludge byproducts; and
   means for reducing bacteria and viruses from said second output water to produce potable output water.

7. The treatment facility of claim 6 wherein said bacteria and viruses reducing means comprises ultra-violet radiation.

8. The treatment facility of claim 6 wherein said bacteria and viruses reducing means comprises chlorine treatment.

9. The treatment facility of claim 6 wherein said bacteria and viruses reducing means comprises nano-filtration.

10. The treatment facility of claim 1 wherein said clarifier is sized in volume to hold approximately $\frac{1}{6}^{th}$ of an average twelve hour volume of said digester.

11. The treatment facility of claim 1 wherein said facility is constructed modularly such that N digesters and M clarifiers work together to feed a single purifier portion.

12. The treatment facility of claim 11 wherein N and M are equal and between 2 and 5.

13. The treatment facility of claim 1 further comprising:
   means for agitating wastewater within said digester with air.

14. The treatment facility of claim 1 wherein said reintroducing means comprises:
   skimmers positioned to vacuum suspended solids from the top of fluid in said clarifier,
   catch boxes at the bottom of said clarifier to catch suspended solids that fall to a bottom of said water in said clarifier; and
   a vacuum to move material from said skimmers and from said catch boxes to said digester.

15. The treatment facility of claim 14 wherein said clarifier further comprises:
   a weir positioned just below the surface of water in said clarifier for allowing liquid to flow over said weir into said recycler.

16. A system for water reclamation, said system comprising:
   an aeration digester arranged to provide bacteria interaction with water to be reclaimed and further arranged to provide air turbulence to maintain an appropriate oxygen level as well as to agitate said water so as to reduce the size of solids suspended within said water, said aeration digester comprising an input for receiving water to be reclaimed and an output for moving water, after a period of time, from said aeration digester;
   a clarifier having an input for receiving said water from said aeration digester and an output, said clarifier operable for allowing suspended solids in said water, received at said clarifier input, to be separated in a manner such that suspended solids that fall to the bottom of said clarifier are vacuumed from the bottom of said clarifier back into said aeration digester and suspended solids that rise to the surface of said water in said clarifier are skimmed and returned to said aeration digester, wherein said aeration digester is the only portion, of said system for water reclamation, adapted to reduce said suspended solids from said clarifier;
   a recycler adapted to return solids over a certain size to said aeration digester for further bacteria and air turbulence interaction, said aeration digester and said clarifier arranged such that all material flowing from said aeration digester flows to said clarifier; and
   a water purification system for reducing and removing parasites, hazardous chemicals, bacteria and viruses from water available at said clarifier output, said water purification system having an output for discharging reclaimed potable water without attendant sludge coming from said system for water reclamation, said output being the only output from said system for water reclamation.

17. The system of claim 16 wherein said clarifier has a retention time of three hours or more.

18. The system of claim 17 wherein said certain size is 5 microns.

19. The system of claim 18 wherein said water purification system for reducing parasites comprises means for filtering suspended solids above 1 micron.

20. The system of claim 19 wherein said water purification system for reducing hazardous chemicals comprises means for adsorption and absorption of said chemicals resulting in hazardous chemical free water as well as non-toxic byproducts.

21. The system of claim 20 wherein said water purification system for reducing bacteria and viruses comprises means for exposing said water to ultra-violet light.

22. The system of claim 20 wherein said water purification system for reducing bacteria and viruses comprises chlorine treatment of said hazardous chemical free water.

23. The system of claim 16 wherein said system is constructed modularly such that N digester portions and M clarifier portions work together to feed a single purifier system.

24. The system of claim 23 wherein N and M are equal and between 2 and 5.

25. The system of claim 16 wherein said period of time is 12 hours.

26. A method for wastewater treatment, said method comprising:
   accepting wastewater to be treated into an aerobic digester;
   subjecting said accepted wastewater to bacterial agitation and oxygen by said digester;
   accepting digester output water into a clarifier;
   separating solids, by said clarifier, from said digester output water;
   reintroducing, back into said digester, separated solids such that there is no sludge output from a system applying the method, said system comprising said digester and said clarifier, wherein, in the method, said aerobic digester is the only portion used for reducing said separated solids from said clarifier;
   flowing all fluid from said clarifier into a recycler that filters out all remaining suspended solids above an established size;
   returning all filtered out suspended solids via an automated back-flush process to said digester so as to eliminate all sludge; and
   purifying water containing solids below said established size by reducing parasites, hazardous chemicals, bacteria and viruses, such that said parasites, said hazardous chemicals, said bacteria and said viruses are reduced to a point where said purified water is potable.

27. The method of claim 26 wherein said established size is 5 microns.

28. The method of claim 26 wherein said reducing hazardous chemicals comprises adsorption and absorption of said hazardous chemicals, said adsorption and absorption resulting in non-toxic byproducts.

29. The method of claim 28 wherein said reducing bacteria and viruses comprises exposing said water containing solids below 1 micron to ultra-violet light.

30. The method of claim 26 wherein said water purifying comprises:
filtering suspended solids above 1 micron to produce filtered output water;
adsorption and absorption of hazardous chemicals in said filtered output water, said adsorption yielding hazardous chemical free output water as well as non-toxic, non-sludge byproducts; and
reducing bacteria and viruses from said hazardous chemical free output water to produce potable output water.

31. The method of claim 30 wherein said reducing bacteria and viruses comprises ultra-violet radiation.

32. The method of claim 30 wherein said reducing bacteria and viruses comprises chlorine treatment.

33. The method of claim 30 wherein said reducing bacteria and viruses comprises nano-filtration.

34. The method of claim 26 wherein a time from when water begins to be digested to when water is potable is in a twelve hour range.

35. The method of claim 26 wherein a single said purifying accepts water from N digesters and M clarifiers.

36. The method of claim 35 wherein N and M are equal and between 2 and 5.

37. A method of treating wastewater, in a wastewater treatment system, said method comprising:
passing water through a first stage, said first stage designed to create aerobic and bacteria interaction with contaminants in said water, said aerobic and bacteria interaction facilitated by forcefully churning water while said water is within said first stage;
moving some water from said first stage to a second stage, said moved water taken from a location within said first stage designed to have the cleanest water within said first stage; said second stage designed to allow a portion of any suspended solids within said moved water to be recycled back to said first stage, wherein, in the method, said aerobic interaction in the first stage is the only process for reducing said suspended solids;
allowing a portion of said water from said second stage to flow into a third stage, said third stage designed to recycle back to said first stage all solids above a certain limit which are suspended within water in said third stage; and
running water remaining in said third stage after said last-mentioned recycling through a process to reduce parasites, hazardous chemicals, bacteria and viruses so as to produce potable water and no sludge from the wastewater treatment system.

38. The method of claim 37 wherein said certain limit is 10 microns.

39. The method of claim 37 wherein said certain limit is 5 microns.

40. The method of claim 37 wherein said parasites reduction is by removing all suspended solid above 1 micron and wherein said bacteria and virus reduction is by ultra-violet light.

41. A wastewater treatment system comprising:
an aeration digester adapted to (a) receive wastewater to be treated and (b) allow aerobic bacteria to feed on waste products in the wastewater;
a clarifier adapted to (i) receive effluent of the digester, (ii) remove suspended solids from the effluent of the digester, and (iii) return the removed suspended solids to the digester;
a recycler unit adapted to: (1) receive effluent of the clarifier, and (2) return suspended solids above a first size from the effluent of the clarifier to the digester, wherein, in the wastewater treatment system, the aeration digester is the only portion adapted to reduce the suspended solids from the clarifier; and
a water purification unit adapted to: (A) receive effluent of the recycler unit and (B) capture all suspended solids above a second size from the effluent of the recycler unit; and
an output from said wastewater treatment system for flowing the effluent of the recycler unit from the wastewater treatment system, the output being the only output from the wastewater treatment system.

42. The wastewater treatment system of claim 41 wherein said first size is 5 microns and said second size is 1 micron.

43. A method for treating wastewater, said method comprising:
receiving, into an aerobic digester of a wastewater treatment system, wastewater to be treated;
allowing aerobic bacteria to feed on waste products in the wastewater, in the aerobic digester;
receiving, into a clarifier of the wastewater treatment system, effluent of the aerobic digester,
removing suspended solids from the effluent of the aerobic digester, by the clarifier, and returning the removed suspended solids to the aerobic digester, wherein, in the method, processes in the aerobic digester are the only processes for reducing the suspended solids from the clarifier;
receiving, in a recycler unit of the wastewater treatment system, effluent of the clarifier;
removing all suspended solids above a first size from the effluent of the clarifier, by the recycler unit, and returning the removed suspended solids above the first size to the aerobic digester;
receiving, in a water purification unit of the wastewater treatment system, effluent of the recycler unit; and
removing all suspended solids above a second size, by the water purification unit, and
discharging potable water from the water purification unit; and
wherein no sludge is discharged from the wastewater treatment system.

44. The method of claim 43 wherein said first size is 5 microns and said second size is 1 micron.

45. The method of claim 43 wherein the water purification unit is adapted for:
purifying water by reducing parasites; reducing hazardous chemicals; and reducing bacteria and viruses.

46. The method of claim 45 wherein said reducing hazardous chemicals comprises adsorption and absorption of said hazardous chemicals, said adsorption and absorption resulting in non-toxic byproducts.

47. The method of claim 45 wherein said reducing bacteria and viruses comprises exposing said water to ultra-violet light.

* * * * *